United States Patent [19]

Clarke

[11] 4,115,190

[45] Sep. 19, 1978

[54] HIGH BETA PLASMA OPERATION IN A TOROIDAL PLASMA PRODUCING DEVICE

[75] Inventor: John F. Clarke, Oak Ridge, Tenn.

[73] Assignee: The United States of America as represented by the United States Department of Energy, Washington, D.C.

[21] Appl. No.: 744,473

[22] Filed: Nov. 24, 1976

[51] Int. Cl.² .............................................. G21B 1/00
[52] U.S. Cl. ..................................... 176/3; 315/111.7
[58] Field of Search ...................................... 176/1-3; 315/111.4–111.7

[56] References Cited

U.S. PATENT DOCUMENTS 3,733,248  5/1973  Hendel et al. ............................ 176/1
3,886,602  5/1975  Furth et al. ......................... 315/111.4

OTHER PUBLICATIONS

UCRL-50002-75, CTR Annual Report, 71-74-6-75, (10/15/75), pp. 77-78.

Proceedings of the Utah Academy of Sciences, Arts and Letters, vol. 50, Part 2, (1973), pp. 47-57.
IEEE Transactions on Plasma Science, vol. PS-4, No 3, (9/76), pp. 162-165.

Primary Examiner—Stephen C. Bentley
Assistant Examiner—S. A. Cangialosi
Attorney, Agent, or Firm—Dean E. Carlson; Stephen D Hamel; Louis M. Deckelmann

[57] ABSTRACT

A high beta plasma is produced in a plasma producing device of toroidal configuration by ohmic heating and auxiliary heating. The plasma pressure is continuously monitored and used in a control system to program the current in the poloidal field windings. Throughout the heating process, magnetic flux is conserved inside the plasma and the distortion of the flux surfaces drives a current in the plasma. As a consequence, the total current increases and the poloidal field windings are driven with an equal and opposing increasing current. The spatial distribution of the current in the poloidal field windings is determined by the plasma pressure. Plasma equilibrium is maintained thereby, and high temperature, high beta operation results.

1 Claim, 3 Drawing Figures

HIGH BETA PLASMA OPERATION IN A TOROIDAL PLASMA PRODUCING DEVICE

BACKGROUND OF THE INVENTION

This invention was made during the course of, or under, a contract with the United States Energy Research and Development Administration.

Many toroidal plasma producing devices can be characterized in terms of two main magnetic fields, toroidal and poloidal, oriented orthonogonally, that combine to form a resultant helical magnetic field such that the plasma produced in the device is a diffuse toroidal column confined on a nested complex of magnetic surfaces composed of the helical magnetic field lines.

In these devices, the toroidal component $B_T$ is set up by a circular array of coils known as the toroidal field coils (or simply TF coils) that are distributed around the toroidal plasma chamber. The poloidal component, $B_p$, in these devices comes from a toroidal electric current that flows inside the plasma column itself and coils wound in the toroidal direction. This plasma toroidal current is created by a toroidal electric field produced by a transformer which consists of a set of primary windings, and the plasma current itself constitutes the single-turn secondary winding of the transformer. The primary windings are also known as the primary ohmic heating (OH) windings. Thus, a pulsed magnetizing current in the primary (ohmic heating) driving windings generates a magnetizing magnetic flux that in turn induces an axial current, $I_p$, in the plasma. The circulating plasma current generates the desired poloidal field, $B_p$.

In the course of a discharge in a plasma device of toroidal configuration, a plasma that is confined by only $B_T$ and $B_p$ would tend to expand in major radius under its own internal pressure and would lack position equilibrium. In order to maintain the plasma position equilibrium throughout the discharge, an additional set of windings, called the poloidal field windings, are provided. The current carried on these windings provides a boundary for the plasma-produced poloidal field, $B_p$. It is the Lorentz force generated by the interaction of the plasma poloidal field, $B_p$, and the poloidal field winding current, $I_w$, both of which are time dependent, that provides the basic equilibrium of the plasma.

It is fundamental to the operation of the poloidal field windings that they be driven so as to produce a Lorentz force that is everywhere equal and opposite to the pressure force in the plasma that is causing the expansion. Plasma producing devices of toroidal configuration that have been operated to date are all driven at a constant plasma current throughout the discharge. As a consequence, the poloidal field windings are also controlled. so as to regulate the net poloidal field winding current, $I_w$, to a constant value.

In plasma producing devices of toroidal configuration that have been operated to date, there have been produced a certain quantity of neutrons. However, the neutron production rate has not been as high as desired because such devices operate at a characteristically low beta. Beta ($\beta$) generally refers to the total beta and is defined as the ratio of the plasma energy to the confining magnetic field energy (magnetic flux). The symbol for the plasma pressure, p, is often used for the plasma energy. Thus, $\beta = 2\mu_0 p/B^2$. It is important and/or desired to be able to operate at the highest possible value of beta, in order to achieve a more favorable neutron production rate and thus provide for more efficient neutron sources. The above follows from the fact that the neutron production rate at a given magnetic field strength depends upon the square of the beta.

In the low beta, ohmically-heated plasma producing devices of toroidal configuration that have been operated to date, the beta can be written as follows:

$$\beta = \frac{\beta_p}{q^2 A^2} \tag{1}$$

where the beta poloidal term, $\beta_p$, is the ratio of the plasma pressure to the poloidal magnetic field; $q$ is a stability factor called the magnetic safety factor; and A is the plasma aspect ratio, the ratio of the plasma major radius to the plasma minor radius. The term, $q$, is defined as the ratio of toroidal flux to poloidal flux between two infinitesimally close flux surfaces.

In view of the low $\beta$ operation of prior devices as discussed above, there exists a need for providing a device that can be operated at substantially higher values of $\beta$. The present invention was conceived to meet this need in a manner to be described hereinbelow.

SUMMARY OF THE INVENTION

It is the object of the present invention to provide a plasma producing device of toroidal configuration that can be operated at high values of $\beta$, thus substantially increasing the neutron production rate.

The above object has been accomplished in the present invention by operating such a device on the principle of conservation of magnetic flux. Thus, the plasma pressure is permitted to increase during operation of the device and the magnetic surfaces in the plasma distort to change the internal shape of the plasma. It is the distortion of these flux surfaces that effects an increase in the current flowing in the plasma. Consequently, the poloidal field external to the plasma changes and the current in the poloidal field windings must be changed if plasma position equilibrium is to be maintained. By making or keeping the current in the poloidal field windings equal and opposite to the plasma current during all stages of operation of the device, high beta operation will result from flux conservation, provided that the proper spatial distribution of the current in the poloidal field windings is controlled in a manner to be described hereinbelow.

DESCRIPTION OF THE PREFERRED EMBODIMENT

Figure 1:
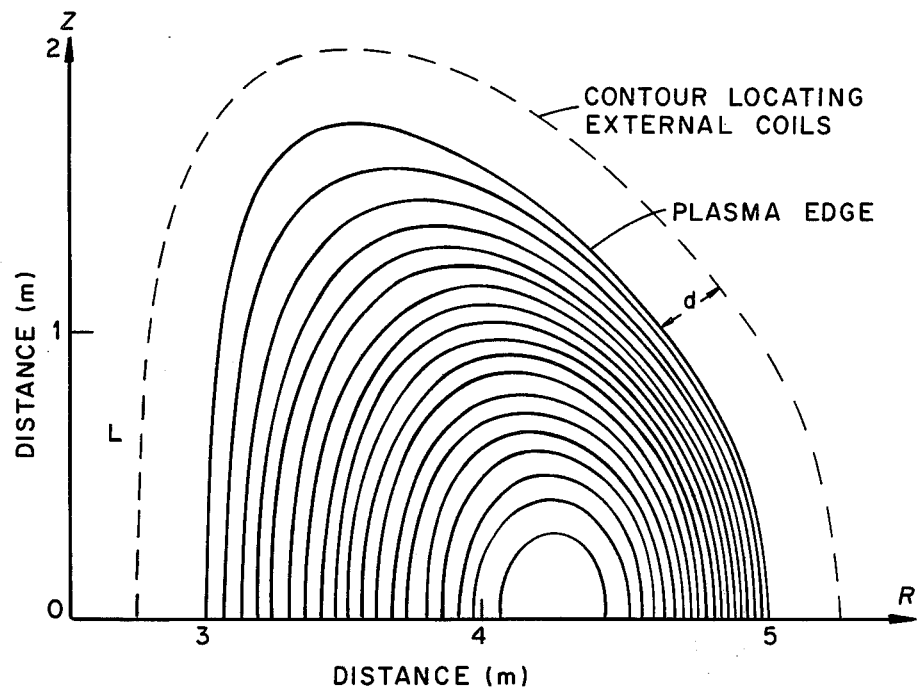
FIG. 1 is a schematic illustration of the magnetic flux surfaces for a D shaped plasma maintained in equilibrium by a set of conductors located a distance, $d$, from the plasma surface in a plasma producing device of toroidal configuration.

One plasma producing device of toroidal configuration in which the present invention may be utilized, for example, is disclosed in the application of Frederick B. Marcus, Ser. No. 720,864, filed Sept. 7, 1976, now U.S. Pat. No. 4,087,322 entitled *Air Core Poloidal Magnetic*

Field System For A Toroidal Plasma Producing Device, and having a common assignee with the present application. In such a device, or in other more conventional devices, there are provided poloidal and toroidal magnetic fields for confining a toroidal plasma column with a plasma current induced therein along a circular equilibrium axis in a torus vacuum cavity.

It should be understood that the following steps of the present invention apply to a plasma producing device of toroidal configuration that is being heated by auxiliary heating following the initial ohmic heating step, and in which magnetic flux in the plasma is being conserved.

Simply stated, flux conservation means that the magentic flux linking a plasma pressure surface will be preserved in spite of changes in the shape or configuration of that surface. Therefore, the concept of flux conservation provides a rule which allows the selection of a precise sequence of equilibrium through which a plasma will pass during the process of being heated to high beta.

The initial step of the present invention is to measure the average plasma pressure, $p$, since it is not predictable beforehand, and use the information to calculate the flux conserving equilibrium using the basic equilibrium equation (2), below. A system of diagnostics such as a combination of laser beams may be used to measure the density and temperature of the plasma across a plasma cross section in order to obtain the pressure. The equation for calculating flux conserving equilibrium is:

$$\Delta^* \Psi = -4\pi(R^2 p' + FF') \qquad (2)$$

where the psi term is the plasma flux function that describes the magnetic surfaces containing the plasma, $R$ is the major radius of the plasma producing device, and $p$ is the plasma pressure ($p'$ is actually the derivative of the plasma pressure with respect to magnetic flux).

At low plasma pressure, that is, at low beta, the magnetic surfaces are just a set of nested circular toroidal surfaces in the plasma. As the plasma is heated and higher plasma pressures are attained these magnetic flux surfaces usually distort into a set of nested d-shaped surfaces. At any rate, in equation (2) the F function is defined as the product of the major radius and the toroidal magnetic field, and is usually considered to be an arbitary function. However, it has been determined that the F function is related to the safety factor, $q$, as shown in the following equation:

$$F = \frac{4\pi^2 q(\Psi)}{V' <R^{-2}>} \qquad (3)$$

where $V'$ is the specific volume between two flux surfaces, and $<R^{-2}>$ is the average major radius of the flux surfaces.

In order to calculate the flux conserving equilibrium in equation (2), the F function is first determined from equation (3). The safety factor, $q$, in distinction to the plasma pressure, $p$, is an invariant and needs to be measured only once at the beginning of the plasma discharge. As set forth above, the term, $q$, is defined as the ratio of toroidal flux to the poloidal flux between two infinitesimally close flux surfaces. A q-profile consistent with the low beta equilibrium from which the heating process starts is chosen, and a continuous analysis of the detailed heating process determines the initial and many subsequent values of the pressure profile $p'$. With these functions determined, equation (2) can be solved.

The next step is to calculate the poloidal magnetic field vector $B_p$, which is defined as the vector cross product of a vector in the toroidal direction, $i_\phi$, with the gradient of the psi function divided by R, $$B_p = i_\phi \times \nabla\Psi/R. \qquad (4)$$

$B_p$ must be evaluated on the contour of the vertical field windings and is likewise a numerical calculation.

With $B_p$ calculated and expressed in terms of the internal pressure in the plasma, the next equation:

$$I_w = \frac{V' <B_p^2>}{8\pi} \qquad (5)$$

can be solved, where $<B_p^2>$ is a flux surface average of the poloidal field at the plasma surface. This equation is the determination of the total current flowing in the plasma, and it is seen that the current flowing within a given flux surface is directly related to the flux surface average of the square of the poloidal magnetic flux. The net current that has to be driven in the poloidal field windings in order to achieve equilibrium under moderate and high beta conditions is just this current, $I_w$.

The distribution of the current $I_w$ within the poloidal field winding is found by evaluating the expression:

$$\overleftarrow{K} = \frac{\overleftarrow{n} \times B_p}{4\pi} \qquad (6)$$

where K is the current density per unit length on the surface containing the poloidal field windings and $n$ is a unit vector normal to this surface. Thus, both the magnitude and distribution of the poloidal field winding current is determined.

The distribution of currents required to sustain a high beta flux-conserving equilibria is illustrated in FIG. 1 of the drawings which shows a set of magnetic flux surfaces for a D-shaped plasma maintained in equilibrium by a set of poloidal field winding coils located a distance, $d$, from the plasma surface in a plasma producing device of toroidal configuration. The set of coils located on the contour, represented by the dashed line in FIG. 1, is used to provide the equilibrium as the beta poloidal of the plasma is increased by any desired heating technique.

Figure 2A:
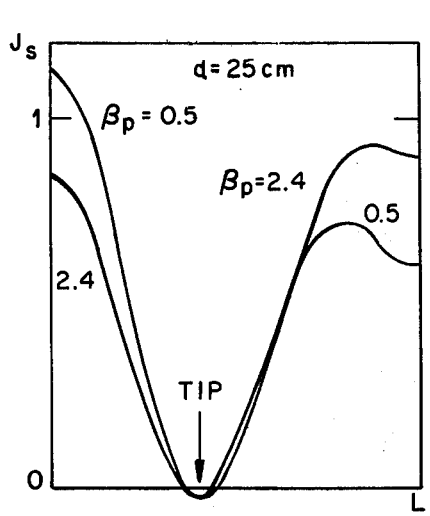
FIGS. 2A and 2B are respective graphs illustrating the current distribution along the contour, L, of FIG. 1 necessary to maintain the plasma in equilibrium as the poloidal beta is raised from 0.5 to a value of 2.4 for two respective values of the separation distance, $d$.
Figure 2B:
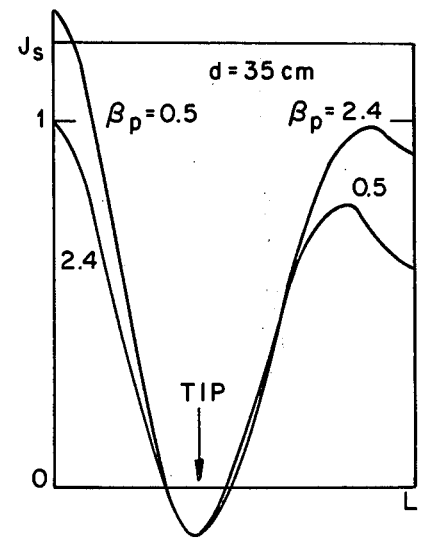

FIGS. 2A and 2B illustrate the distribution of current along the contour L of FIG. 1 during this heating process for two different values of the separation $d$. Thus, it should be noted that it is possible to sustain a high beta flux-conserving equilibria with currents flowing in a shell at a resonable distance from the plasma, while allowing the inclusion of coil shielding and structure.

To sum up the above-described steps, the currents that are to be programmed in the poloidal field windings of a plasma producing device of toroidal configuration are determined by measuring the pressure increase in the plasma being produced in the device and the $q$ profile. The pressure is measured continuously, but because of flux conservation, $q$ is fixed and is measured only once for the initial calculation. The equilibrium equation (2) is then solved using the measured $p$ and the measured $q$. From the solution of equation (2), the specific volume between two flux surfaces $V'$, and the poloidal field $B_p$ are determined. The last step is that performed by solving equation (5) to determine the net current that is required for the poloidal field windings and using equation (6) to determine the current distribution to be effected in the poloidal field windings. The above steps are repeated for each measurement of $p$ as the plasma pressure is being gradually increased during the heating of the plasma. Thus, a flux conserving equilibrium will be achieved during all stages of operation of the device as the plasma is being heated to a high beta.

By operating a plasma producing device on the principle of flux-conservation as described above, such that operation of the device at high beta is achieved, the neutron production rate of the plasma thereof is substantially increased over that achievable by the prior art, such that a more efficient neutron source is provided.

This invention has been described by way of illustration rather than by limitation and it should be apparent that it is equally applicable in fields other than those described.

What is claimed is:

1. In a method for producing a plasma in a device of toroidal configuration having poloidal and toroidal magnetic fields provided by respective field windings for confining a toroidal plasma column with a plasma current induced therein along a circular equilibrium axis in a torus vacuum cavity by means of primary ohmic heating windings, and further heating said plasma column by auxiliary heating after the ohmic heating thereof, the improvement comprising the steps of measuring the average plasma pressure, $p$; determining the magnetic safety factor, $q$; determining a magnetic flux conserving equilibria by means of the equation:

$$\Delta^*\Psi = -4\pi(R^2 p' + FF'),$$

Where R is the major radius of said device, $p'$ is the derivative of the plasma pressure with respect to magnetic flux, and the F function is related to the safety factor, q, as determined by the equation:

$$F = \frac{4\pi^2 q(\psi)}{V' <R^{-2}>},$$

where $V'$ is the specific volume between two flux surfaces, and $<R^{-2}>$ is the average major radius of the flux surfaces; determining the poloidal magentic field as a function of said equilibria by means of the equation:

$$B_p = i_\phi \times \nabla\Psi/R,$$

where $i_\phi$ is a vector in the toroidal direction; utilizing said volume and said determined poloidal magnetic field for determining the total current $I_w$ flowing in said plasma based on the relationship:

$$I_w = \frac{V' <B_p^2>}{8\pi},$$

where $<B_p^2>$ is a flux surface average of the poloidal field at the plasma surface; and finally controlling the respective current flow to respective ones of said poloidal field windings such that the total current flow to said poloidal field windings is equal and opposite to said total plasma current $I_w$, the distribution of the current to the poloidal field windings being determined by the expression;

$$K = \frac{n \times B_p}{4\pi},$$

where K is the current density per unit length on the surface containing the poloidal field windings and $n$ is a unit vector normal to this surface; and repeating all of the above steps for each measured value of said pressure which increases during the heating of said plasma by means of said auxiliary heating whereby a magnetic flux conserving equilibrium is maintained during all stages of operation of said method and the beta which is directly related to said pressure will ultimately reach a high value, thus ultimately providing a substantially high neutron production rate which is a function of the square of the beta.

* * * * *

UNITED STATES PATENT OFFICE
CERTIFICATE OF CORRECTION

Page 1 of 2

Patent No. 4,115,190     Dated  September 19, 1978

Inventor(s)  John F. Clarke

It is certified that error appears in the above-identified patent and that said Letters Patent are hereby corrected as shown below:

Column 1, line 66 for "$\beta = 2\mu op/B^2$" read ---$\beta = 2\mu_0 p/B^2$---

Column 3, lines 14 and 15 for "ma-gentic" read ---mag-netic---

Column 3, line 23 for "p" read ---$\bar{p}$---

Column 3, line 32 for "$\Delta^*\Psi = -4\pi(R^2 p' + FF),$" read

---$\nabla^*\Psi = -4\pi(R^2 p' + FF'),$---

Column 3, line 47 for "arbitary" read ---arbitrary---

Column 4, line 8 for "$B_p = i_\phi \times \nabla\Psi/R.$" read ---$B_p = \hat{i}_\phi \times \nabla\Psi/R.$---

Column 4, line 35 for "K" read --- $\vec{K}$ ---

Column 4, line 36 for "n" read --- $\vec{n}$ ---

Column 4, line 56 for "resonable" read ---reasonable---

Column 5, line 39 for "$\Delta^*\Psi = -4\pi(R^2 p' + FF),$" read

---$\nabla^*\Psi = -4\pi(R^2 p' + FF'),$---

Column 6, line 10 for "$B_p = i_\phi \times \nabla\Psi/R,$" read ---$B_p = \hat{i}_\phi \times \nabla\Psi/R,$---

UNITED STATES PATENT OFFICE

CERTIFICATE OF CORRECTION

Patent No. 4,115,190      Dated September 19, 1978

Inventor(s) John F. Clarke

It is certified that error appears in the above-identified patent and that said Letters Patent are hereby corrected as shown below:

Column 6, line 12 for "$i_\phi$" read --- $\hat{i}_\phi$ ---

Column 6, line 30 for "$K = \frac{n \times B_p}{4\pi}$," read --- $\overleftarrow{K} = \frac{\overleftarrow{n} \times B_p}{4\pi}$, ---

Column 6, line 32 for "$K$" read --- $\overleftarrow{K}$ ---

Column 6, line 33 for "$n$" read --- $\overleftarrow{n}$ ---

*Signed and Sealed this*

*Twenty-seventh* Day of *March 1979*

[SEAL]

Attest:

RUTH C. MASON
*Attesting Officer*

DONALD W. BANNER
*Commissioner of Patents and Trademarks*